No. 844,096. PATENTED FEB. 12, 1907.
L. BURK.
PREPARING HAMS FOR MARKET.
APPLICATION FILED JUNE 30, 1904.
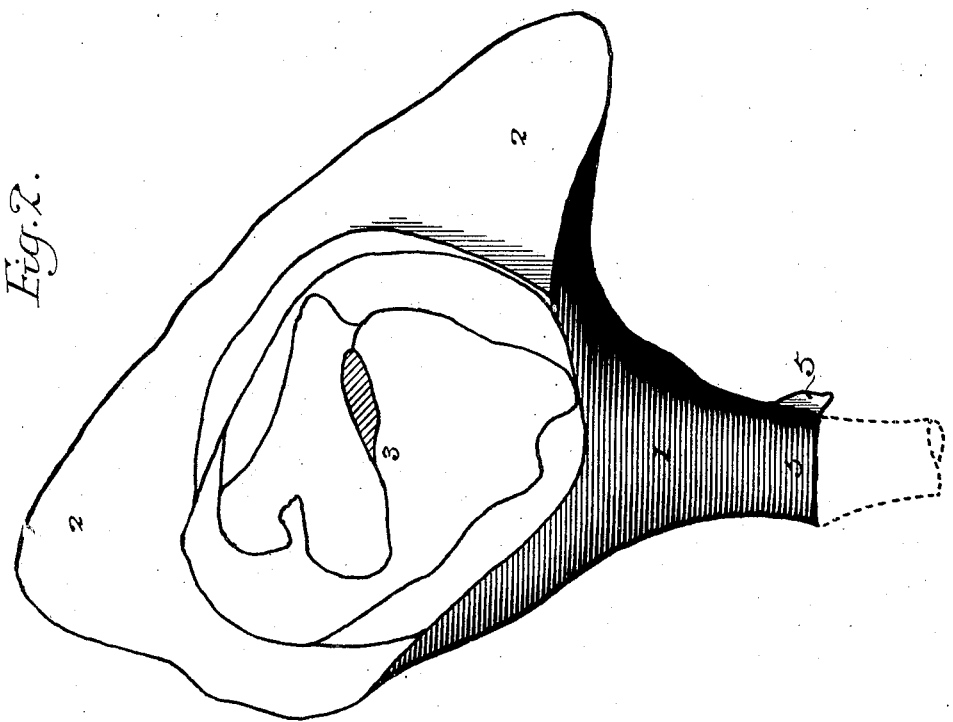
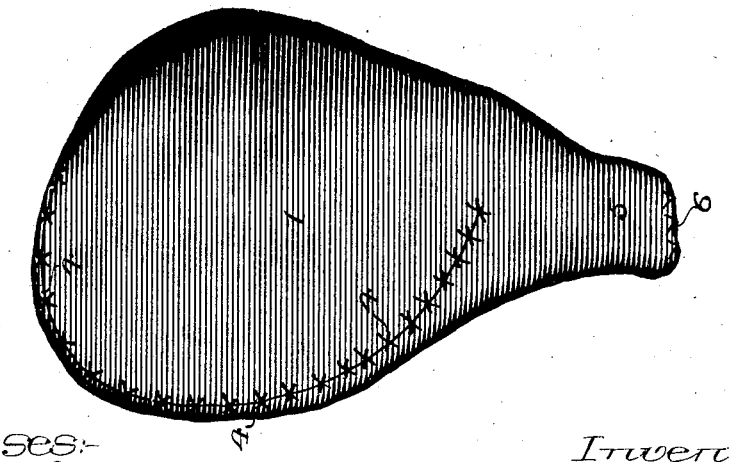

UNITED STATES PATENT OFFICE.

LOUIS BURK, OF PHILADELPHIA, PENNSYLVANIA.

PREPARING HAM FOR MARKET.

No. 844,096.     Specification of Letters Patent.     Patented Feb. 12, 1907.

Application filed June 30, 1904. Serial No. 214,832.

*To all whom it may concern:*

Be it known that I, LOUIS BURK, a citizen of the United States, and a resident of Philadelphia, Pennsylvania, have invented certain Improvements in Preparing Hams for Market, of which the following is a specification.

The object of my invention is to so prepare a ham for market as to render unnecessary any artificial covering therefor and at the same time prevent loss of the natural juices of the meat while the same is being cooked.

In the accompanying drawings, Figure 1 represents a ham prepared for market in accordance with my invention, and Fig. 2 represents the ham as removed from the animal ready to be trimmed and inclosed in accordance with my invention.

In the ordinary practice of preparing hams for market the outer portion of the ham and the shank of the same retain their natural skin; but the flesh where the ham is severed from the body of the animal is usually exposed, and the ham after being cured is either sold in this way or is incased in a bag of textile material, which is removed before the ham is cooked. The marketing of hams with the flesh exposed is objectionable because the exposed surface is subject to soiling or infection by flies or other insects, and the incasing of the ham in a bag involves additional expense, and in either case there is a loss of the natural juices of the ham in cooking, since such juices can escape from the uncovered or exposed flesh surface of the ham.

In carrying out my invention I preferably permit the skin to remain unbroken on the shank and adjacent portions of the ham, as shown, for instance, at 1; but I so cut portions of the rest of the skin of the animal that projecting flaps 2 are formed at the upper portion and at one side of the ham, as shown in Fig. 2, which flaps can be closed in, as shown in Fig. 1, over what would otherwise be the exposed flesh-surface 3 of the ham, the adjoining edges of these flaps of skin being secured together by lacing 4 or in any other available manner.

The bone may be entirely removed from the ham or may be permitted to remain in it, as desired. Preferably I removed the bone from all of the ham except the shank portion of the same, permitting it to remain in this portion of the ham so as to impart considerable rigidity to the same, thus facilitating its handling. Flaps 5 of skin are preferably closed in over the shank of the ham and secured by lacing 6 or in any other convenient manner, so that the ham is entirely inclosed within its envelop of skin. The term "inclosed" as used in my claims, however, is not to be regarded as limited to the complete inclosure of the ham, as the shank end may, if desired, be left uncovered. A ham prepared in accordance with my invention is protected from infection and can be boiled or otherwise cooked without losing its natural juices, and the cooked product is therefore more succulent and appetizing than a ham prepared in the ordinary way.

I claim—

1. A ham retaining thereon a part of the natural skin of the animal from which it has been cut, and having the flesh portion at the butt-end inclosed in an envelop formed of said skin.

2. A ham having its shank portion retaining intact therewith the natural skin of the animal from which it has been cut, and the flesh portion at the butt-end covered by flaps of skin integral with said intact skin and having their edges secured together.

3. A ham having the shank portion retaining intact therewith the natural skin of the animal from which it has been cut, and having the flesh portion at the butt-end covered by integral flaps of skin extending from said intact skin and having their adjoining edges secured together; flaps of said intact skin also inclosing the shank end of the ham from which the bone may be removed.

In testimony whereof I have signed my name to this specification in the presence of two subscribing witnesses.

LOUIS BURK.

Witnesses:
 JAMES MCMORRIS,
 JOS. H. KLEIN.